United States Patent
McKay

(10) Patent No.: US 6,207,060 B1
(45) Date of Patent: Mar. 27, 2001

(54) METHOD FOR TREATING WATER TO BE PROVIDED TO AN ANIMAL

(75) Inventor: Scott McKay, San Antonio, TX (US)

(73) Assignee: Enproamerica, Inc., San Antonio, TX (US)

( * ) Notice: Subject to any disclaimer, the term of this patent is extended or adjusted under 35 U.S.C. 154(b) by 0 days.

(21) Appl. No.: 09/263,697

(22) Filed: Mar. 5, 1999

(51) Int. Cl.⁷ .................................................. C02F 1/467
(52) U.S. Cl. .................. 210/696; 205/745; 205/751; 205/759; 210/717; 210/721; 210/748; 210/758; 210/764; 426/66; 426/532
(58) Field of Search .................... 204/248, 267, 204/269, 292, 293; 205/746, 745, 743, 751, 752, 759; 210/696, 716, 717, 721, 722, 748, 758, 764; 426/66, 67, 532

(56) References Cited

U.S. PATENT DOCUMENTS

| | | | |
|---|---|---|---|
| 3,936,364 | * 2/1976 | Middle | 426/66 |
| 4,649,866 | * 3/1987 | Shomer | 119/75 |
| 4,790,946 | * 12/1988 | Jansen | 210/748 |
| 5,007,994 | 4/1991 | Snee | 204/240 |
| 5,603,843 | 2/1997 | Snee | 210/748 |

FOREIGN PATENT DOCUMENTS

WO 98/31636   7/1998   (WO).

* cited by examiner

Primary Examiner—Peter A. Hruskoci
(74) Attorney, Agent, or Firm—Vidas, Arrett & Steinkraus

(57) ABSTRACT

The inventive method assures the retention of calcium in drinking water provided to an animal by suppling water to a water feed line which is connected to a drinking device, oxidizing the water to retain calcium in the water in solution, ionizing the water using copper/zinc electrodes, the ionization sanitizing the water and providing residual copper and zinc ions which act as an algicide and a biocide, and providing the ionized oxidized drinking water which retains calcium in solution to the animal for drinking.

10 Claims, 1 Drawing Sheet

METHOD FOR TREATING WATER TO BE PROVIDED TO AN ANIMAL

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Applicant has previously invented apparatus for the treatment of cooling tower water to control scale, corrosion and biofilm, using electronic oxidation and ionization apparatus. The national stage of this invention, PCT/US97/00885, is pending in the United States as Ser. No. 08/983,376, with an international filing date of Jan. 17, 1997, and the entire contents of this application are hereby incorporated by reference. The electronic oxidation and ionization apparatus is further disclosed in U.S. Pat. No. 5,007,994 and U.S. Pat. No. 5,603,843, the entire contents of which are hereby incorporated by reference. A divisional of U.S. Pat. No. 5,603,843 is still pending as Ser. No. 09/252,389, the entire contents of which are hereby incorporated by reference.

Applicant has been testing its electronic oxidation and ionization apparatus in connection with pullet, layer and production facilities and has discovered major unexpected advantages to its method of treating water in connection with the health of the poultry. These advantages include decreased mortality, increased weight gain of pullets, lower feed conversion, better vaccine results, greater egg production, lower labor costs, lower maintenance, and easier operation of the processing plant.

As is well known in the art, poultry drinking water is provided by $H_2O$ lines connected to drinker cups and/or nipples. The drinker cups have a white ball attached to a nipple, which fill the drinker cup with water. Drinker nipples are held in place by water pressure in the $H_2O$ lines, so that they are normally closed. The bird pushes on the nipple to open the nipple to allow water to drip out. Scale formation has been a major problem in the past in connection with drinker cups and $H_2O$ lines. The valve mechanism includes a seat and ball, and scale forms between the seat and the ball, which prevents the nipple from closing, so that the drinking cup leaks. Leaking drinking cups cause several problems. First, the poultry are stacked in cages, so that if a drinking cup at the top of the stack is leaking, poultry below will get wet. Secondly, the manure on the ground will get wet, which is undesirable since this produces ammonia, which is hazardous to the poultry and maintenance personal. Also, the poultry does not consume the water fast enough and the remaining water becomes stagnant with a bad odor or leaks and drips on the poultry litter. The water in the drinker cups can also become contaminated with feces and bacterial growth. Chlorine cannot be used to clean the drinker cups because the poultry does not like the smell. The poultry will back off drinking water from the drinking cups and drink poor quality water elsewhere, which can make them sick, and causes them to eat less. The poultry gut flora gets destroyed so that the poultry cannot absorb nutrients correctly. The poultry can get secondary infections and suffer from dehydration. All of these health problems result in poorer quality poultry, and poultry with higher mortality rates.

What is needed is a method for treating poultry drinking water which solves the problems discussed above.

BRIEF SUMMARY OF THE INVENTION

The inventive method assures the retention of calcium in drinking water provided to an animal by suppling water to a water feed line which is connected to a drinking device, oxidizing the water to retain calcium in the water in solution, ionizing the water using copper electrodes, the ionization sanitizing the water and providing residual copper ions which act as an algicide and a biocide, and providing the ionized oxidized drinking water which retains calcium in solution to the animal for drinking.

The inventive method may also improve the drinking water by precipitating metals out of the water after oxidation, and filtering out the precipitated metals from the water prior to ionization.

The oxidized and ionized water dissolves calcium into solution from scale deposits.

Although the inventive method is disclosed for use with poultry, which drink from a poultry drinking device, it could be utilized to treat drinking water for any animal.

When the poultry ingest the water retaining calcium in solution, harder egg shells were obtained. Currently, calcium supplements are fed to poultry with their feed, but it has been found that the amount of calcium absorbed into the body is much less from a solid compound as compared to taking the calcium into the body in liquid form.

BRIEF DESCRIPTION OF THE DRAWINGS

In the drawings, wherein like reference numerals represent like parts throughout the several views.

DETAILED DESCRIPTION OF THE INVENTION

While this invention may be embodied in many different forms, there are described in detail herein specific preferred embodiments of the invention. This description is an exemplification of the principles of the invention and is not intended to limit the invention to the particular embodiments illustrated.

Figure 1:
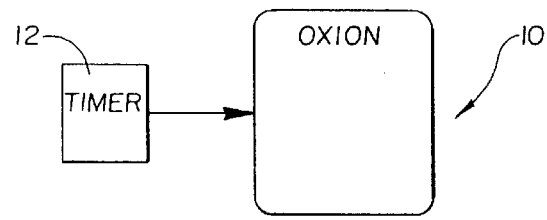
FIG. 1 is a schematic view of the apparatus for performing the inventive method.

Referring now to FIG. 1, the water treatment apparatus is shown generally at 10, and may be controlled with an optional timer 12. In the preferred embodiment, the timer is configured to operate the water treatment apparatus 10 in conjunction with the lighting system of a pullet house.

Figure 2:
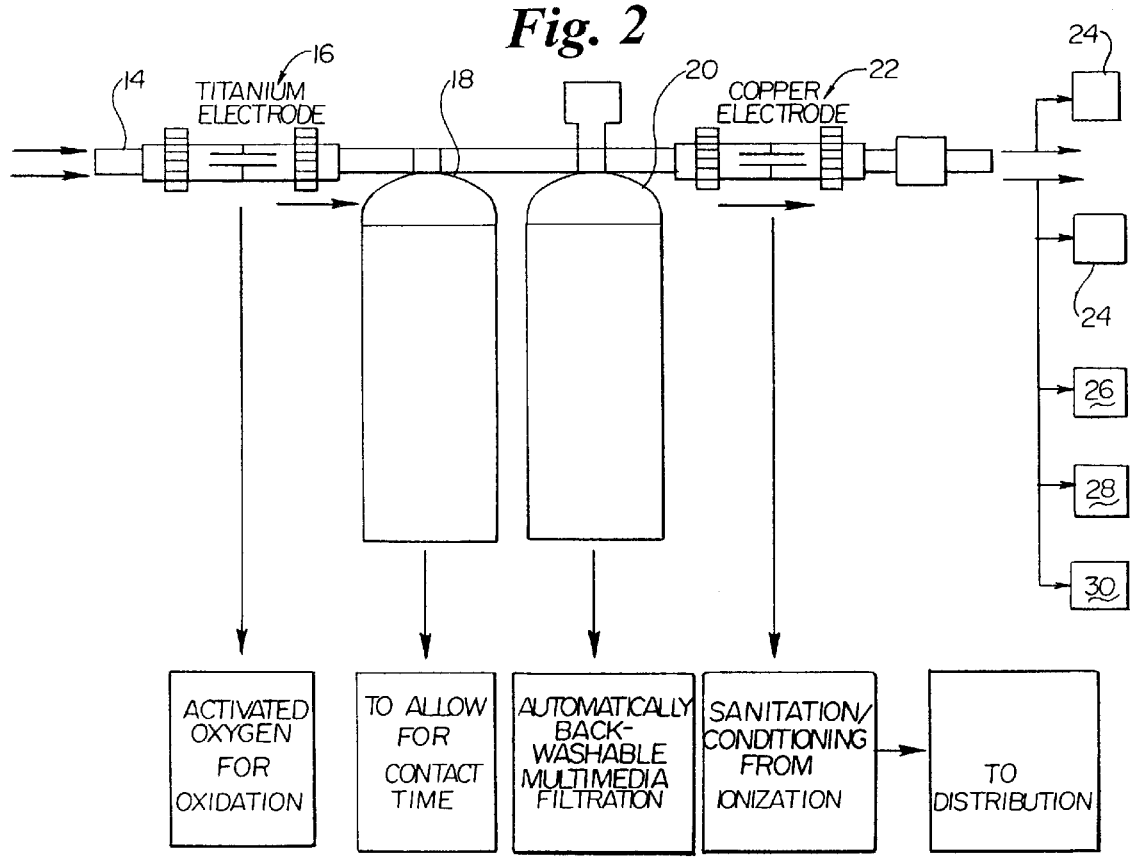
FIG. 2 is a more detailed schematic view of the apparatus for performing the inventive method.

Referring now to FIG. 2, the water feed line is shown at 14, which supplies water, such as well water to a pullet house. The water feed line 14 is connected to the oxidation apparatus 16, which is connected to a holding tank 18, which is connected to a filter tank 20, which is connected to ionization apparatus 22. Ionization apparatus 22 is connected to the distribution line which supplies water to a plurality of pullet drinker cups 24. The treated water is also used in the layer houses 26, the processing plant 28 and the evaporative cooling systems 30 used in connection with pullet and layer houses, as will be discussed further below. The electronic oxidation, filtration and ionization apparatus is of the same general type as described in U.S. Pat. No. 5,007,994, U.S. Pat. No. 5,603,843, and U.S. application Ser. No. 08/983,376.

The oxidation apparatus 16 of the preferred embodiment utilizes a titanium electrode which has been coated with ruthenium, instead of the iridium alloy coated titanium electrode of Ser. No. 08/983,376. The electrodes are coated by Eltech Systems Corp of Chardon Ohio using a commercially available process. The ionization electrodes of apparatus 22 in the preferred embodiment are made of zinc and copper, so that they release zinc and copper ions into the water. In addition to the benefits of copper ions in water as discussed in Ser. No. 08/983,376 and U.S. Pat. Nos. 5,007, 994 and 560,843, which sanitize and act to kill algae, bacteria and fungus, copper has other health benefits for poultry. Currently poultry are feed solid copper supplements which have beneficial health benefits including killing parasites in poultry. However, applicant has discovered that the poultry can better absorb copper in solution compared to copper in solid supplement form. In addition, applicant has learned that zinc in solution also is incorporated into the eggshell, where it acts to kill bacteria.

The treated water is also used for scale control, because the ionized oxidized water prevents scale formation and dissolves existing scale. Scale build-up can shorten the life of pipes due to corrosion and resulting leaks, and in processing plants boilers and lines can cause increased energy consumption to maintain temperature and shorten life due to corrosion and leaks. Therefore, the treated water is used in the processing plants 26, the layer houses 28 and the evaporative cooling systems 30 to prevent scale formation and to sanitize and kill algae, bacteria and fungus. Evaporative cooling systems are well known in the art, such as the Chore-Time Turbo-Cool evaporative cooling system sold by Chore-Time Equipment of Indiana USA, and utilize cooling pads which absorb water which is used to cool air blown into the pullet and layer houses for temperature control, as is well known in the art. Applicant has discovered benefits from using its treated water in connection with evaporative cooling systems, since it washes off scale and kills algae, bacteria and fungus so that the air quality of the cooling air blown into the pullet and layer houses is improved, maintenance on the evaporative cooling system is reduced, and the useful life of the cool cells is extended.

The well water used in the process includes calcium which has been precipitated out and the oxidation process converts this calcium from calcium carbonate to calcium bicarbonate so that the calcium remains in solution. Applicant has learned that preventing calcium from precipitating out of the water and keeping the calcium in solution provides many health benefits to poultry.

In testing done at several pullet houses, one using the inventive method and one using standard water, over an 18 week cycle the poultry drinking the oxidized ionized water which retained calcium in solution showed an average 3.66% increase in weight as compared to the poultry drinking the standard water. There was also a decrease of 17.72% in mortality. The drinker cups 24 using the inventive method stayed clean and showed no algae growth. Cartridge filters used to filter untreated well water had to be replaced an average of twice per eighteen weeks, as compared to an average of once per week prior to using the inventive method. Also better feed conversion resulted in feed savings. Labor savings were also realized in eliminating the necessity of hand cleaning the pullet drinkers, flushing out lines or super chlorinating to remove algae from the water distribution system and the savings from fewer cartridge replacements. The processing plant also had less down time in its plant boilers and lines to remove scale and repair leaks. In the layer houses, the inventive method resulted in higher egg production, better egg hardness and better feed conversion.

The inventive method oxidizes the water to break down organics and precipitate out metals, filters out undesirable particles that have been precipitated out of solution by the oxidation process, sanitation to kill any remaining algae and bacteria and conditioning to lower the surface tension of the water and keep anything remaining in solution. Therefore, the inventive method removes iron, manganese and sulfur, removes scale buildup and prevents new scale from forming and kills fungus, bacteria and algae.

The above examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A method of assuring the retention of calcium in drinking water provided to an animal, comprising the steps of:

supplying water to a water feed line which is connected to a drinking device;

oxidizing the water to retain calcium in the water in solution, wherein the oxidation utilizes a titanium electrode coated with ruthenium;

ionizing the water using copper electrodes, the ionization sanitizing the water and providing residual copper ions which act as an algicide and a biocide;

providing the ionized oxidized drinking water which retains calcium in solution to the animal for drinking.

2. The method of claim 1 further including the steps of:

precipitating metals out of the water after oxidation, and filtering out the precipitated metals from the water prior to ionization.

3. The method of claim 1 further including the step of dissolving calcium into solution from scale deposits.

4. The method of claim 1 wherein the animal is poultry.

5. The method of claim 4 wherein the drinking device is a poultry drinking cup.

6. The method of claim 5 further including the step of the poultry ingesting the water retaining calcium in solution, which results in greater egg shell hardness.

7. The method of claim 1 wherein the copper electrodes also include zinc, which supply zinc ions to the water, which are then absorbed into the animal ingesting the water.

8. The method of claim 7 wherein the animal is poultry and the zinc ions absorbed into the animal are incorporated into the eggshell, where they act to kill bacteria.

9. The method of claim 1 wherein the animal is poultry and the calcium is absorbed into the animal and incorporated into an eggshell, making the eggshell harder.

10. The method of claim 1 wherein the animal is poultry and the copper ions are absorbed into the animal to kill parasites.

* * * * *